FIG. 1.

INVENTOR
WILBUR MARKS
PAUL E. STRAUSSER

AGENT.

INVENTOR
WILBUR MARKS
PAUL E. STRAUSSER

AGENT.

United States Patent Office 3,096,479
Patented July 2, 1963

3,096,479
ENERGY SPECTRUM AND CROSS SPECTRUM
ANALYSIS SYSTEM
Wilbur Marks, Fords, N.J., and Paul E. Strausser, Germantown, Md., assignors to the United States of America as represented by the Secretary of the Navy
Filed Apr. 10, 1961, Ser. No. 102,074
19 Claims. (Cl. 324—77)
(Granted under Title 35, U.S. Code (1952), sec. 266)

The invention described herein may be manufactured and used by or for the Government of the United States of America for governmental purposes without the payment of any royalties thereon or therefor.

The invention is generally directed to apparatus for the reduction of stored data to its desired components, and more particularly to electronic analyzers which scan the frequency spectrum of information representative of simultaneously occurring physical events that are related to each other, and reduce the information to a visual display or permanent record.

The desirability of analyzing stored data electronically and cheaply has been established. Very briefly, analysis is of great value in determining such information as design parameters, failure points, and optimum operating conditions of equipment. Spectrum analyzers have been used in the prior art for analyzing data, and they are mostly single channel devices for analyzing a single complex signal wave which carries the information. The signal wave may be generally of any complex type such as for example one including impulse responses, periodic impulses, complex harmonic waves, and other components. Systems of the above character are described in United States Patent No. 2,535,043, issued to G. W. Cook and United States Patent No. 2,958,822, issued to D. P. Rogers et al.

An object of the present invention is to provide a spectrum analyzer for immediately obtaining several pieces of information from one or more signal waves.

A further object of the invention is to provide a system which is capable of comparing signals which are indicative of what is happening at two or more preselected points.

Another object of the invention is to have a simple system which is completely automatic and easy for an unskilled operator to set into motion and monitor.

Still another object of the invention is to provide a signal analyzing means providing immediate indications of test conditions while the tests are still underway.

Still another object of the invention is to provide a means or system which will analyze a plurality of signals obtained from one or more related physical events, and especially to obtain an indication of the total energy of the signal over a period of time and to obtain an indication of the spectral distribution or relation of the instantaneous energies.

In accordance with the preferred form of the invention, information, in the form of a plurality of individual signal waves obtained at a test site, may be recorded on a magnetic tape, for example, or directly utilized if desired or convenient. The tape is read, and each signal is fed to a separate wave analyzer; the analyzers being, however, maintained in a predetermined relation, normally, operating simultaneously under control of a central oscillator. The outputs of these analyzers are combined in integrators for obtaining instantaneous or a total energy indications. The signals are also treated so that their phaseal relationship may be obtained. This treatment is accomplished by a pair of analog multipliers provided with phase shifter means. Preferably the resulting information is recorded on recording means such as for example coordinates or X-Y plotters. The system enables an operator to obtain a great deal of information in a short period of time.

Other objects and many of the attendant advantages of this invention will be readily appreciated as the same becomes better understood by reference to the following detailed description when considered in connection with the accompanying drawings wherein.

The invention may be utilized with any plurality of signal waves, but can be adequately understood from a description of the treatment of two signals obtained simultaneously from the effects of a physical occurrence.

Figure 1:
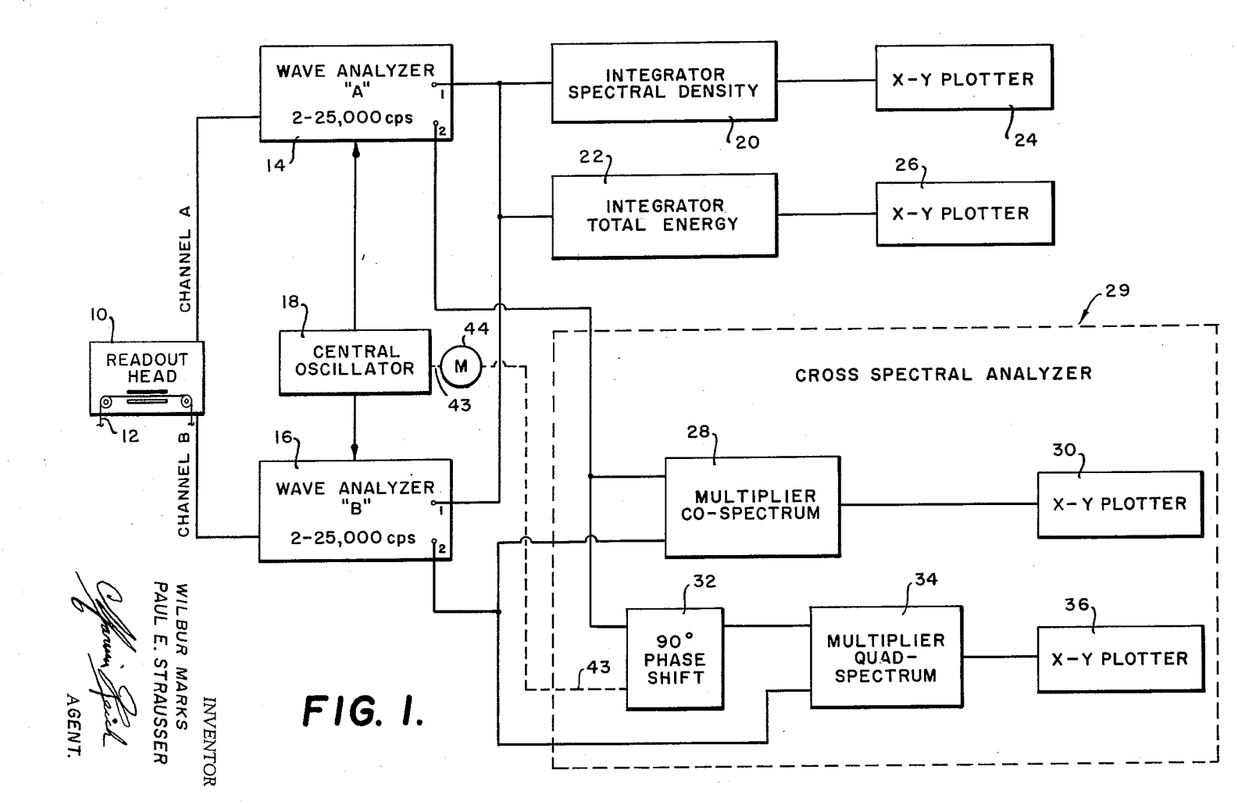
FIG. 1 is a block diagram of a spectrum analyzer in accordance with the invention.

Referring to FIG. 1, two such signals are applied to channels A and B, preferably being simultaneously readout by a multi-channel readout head 10, through which a tape 12 passes having the signals thereon which have been previously simultaneously recorded. The tape is preferably a magnetic tape fed by either a loop or reel type feed.

The signal on channel A, which is in the form of a complex wave, feeds a channel A wave analyzer 14; and a similar signal on channel B feeds a channel B wave analyzer 16. The analyzers 14 and 16 are controlled by a central oscillator 18 so as to maintain the analyzers operating on simultaneous frequencies. Each analyzer comprises at least two outputs. Analyzer outputs 1 feed in parallel a spectral density integrator 20 and a total energy integrator 22, and the outputs of these integrators respectively operate an X-Y plotter 24 and an X-Y plotter 26 on which the outputs are separately recorded.

Analyzer outputs 2 are multiplied in a co-ordinate spectrum multiplier 28 having an output that is recorded on X-Y plotter 30.

In order to get the quadrature spectrum of the signals from the analyzer, it is desirable to have the signals from outputs 2 phase shifted 90° with respect to each other. To this end, the output 2 of wave analyzer 14 is fed to a 90° phase shifter 32 having an output which is fed into one input of a quadrature spectrum multiplier 34. The other input of multiplier 34 is fed directly from the output 2 of wave analyzer 16. The output of multiplier 34 feeds an X-Y plotter 36. Obviously, the phase shifter 32 could have been associated with the wave analyzer 16 instead of wave analyzer 14, or other phase shifting means used.

In order to better understand the operation of the system described in FIG. 1, a description of its components referred to above is first presented. Any suitable X-Y plotters may be used. Satisfactory X-Y plotters for use in the embodiment described are model 3 "Autograf" plotters described in: "Instruction and Operating Manual for Model 3 'Autograf' X-Y Recorder," copyright 1958, by F. L. Moseley Co., 409 Fair Oaks Ave., Pasadena, California.

Any suitable analog multipliers may be used. Suitable analog multipliers for components 8 and 24 are a pair of GAP/R Model MU/DV made and described in a bulletin by George A. Philbrick Researches, Inc., 285 Columbus Avenue, Boston 16, Massachusetts. The bulletin is identified as "Model MU/DV Duplex Multiplier/Divider and MU/DV–3M- and 659."

The Central Oscillator

Figure 3:
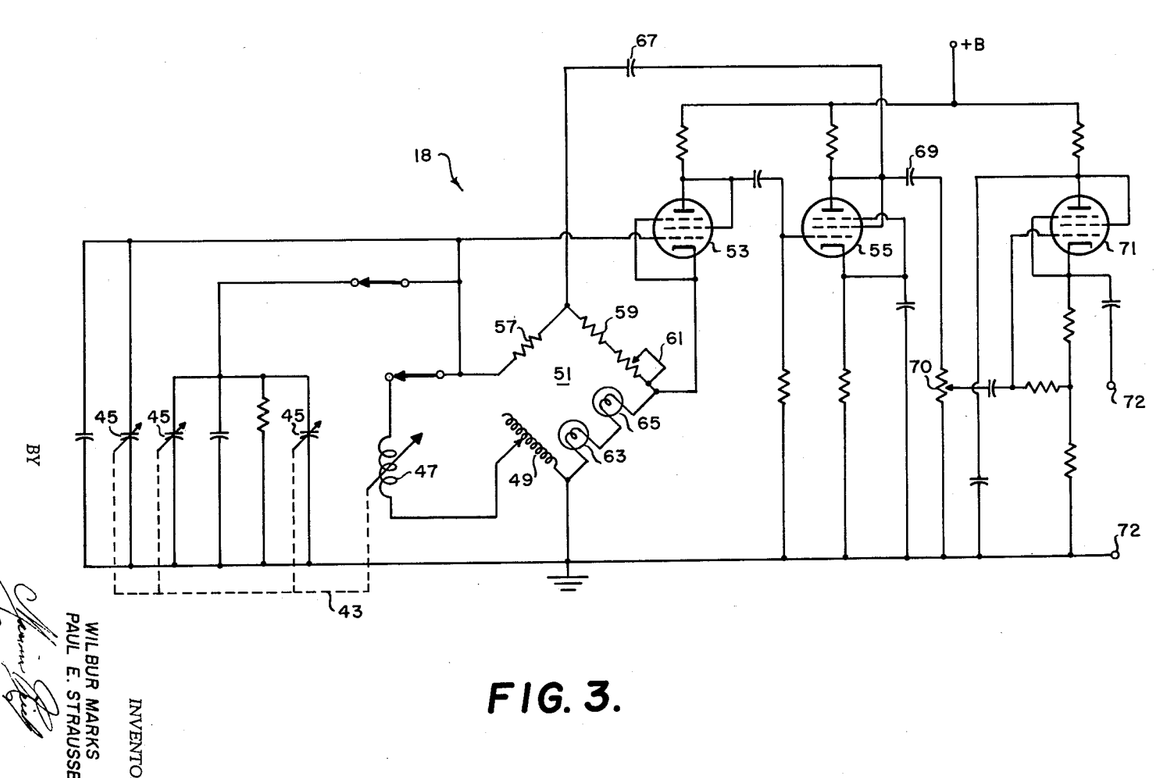
FIG. 3 is a circuit diagram of a suitable stabilized variable frequency central oscillator which may be used in the preferred form of the invention.

The central oscillator is shown in FIG. 3. It is a variable frequency generator whose frequency can be continuously varied smoothly through a predetermined range or discretely set at a predetermined frequency through a rotatable shaft 43 operated by an electric motor 44 or by means of a hand crank not shown. For a particular application of the invention, to which reference will be made herein for illustrating the operation of a preferred embodiment of the invention, the frequency of the oscillator is varied from 97,000 to 122,000 cycles per second (c.p.s.).

The operating frequency of the oscillator is controlled by a resonant circuit comprising variable tuning capacitor 45 and variable inductors 47 and 49 which are varied by movement of shaft 43.

The resonant circuit is one leg of a bridge 51. The range of frequencies over which the oscillator 18 is varied can be extended or reduced in any of several known manners, as for example, by change of the tap of inductor 49, or the values of capacitors 45 or inductor 47, or combinations thereof.

The generator 18 also comprises amplifiers 53 and 55. The input to amplifier 53 is taken from one of the diagonals of the bridge 51, and the output from amplifier 55 is applied across the other diagonal.

The bridge 51 consists of two fixed resistive arms 57 and 59, a potentiometer 61, a thermally controlled resistance arm of lamp 63 and 65, and the frequency controlling parallel resonance circuit that includes the capacitors 45 and inductors 47 and 49.

When the energy loss in the bridge is exactly equal to the gain of the amplifiers the condition for stable oscillation results. Lamps 63 and 65 are thermally controlled and have a positive temperature coefficient, which produces the necessary stabilizing action. When the power is turned on, the lamp filaments are cold and of considerably lower resistance than required to balance the bridge. Thus the bridge loss is low and oscillations build up rapidly.

The output current of amplifier 55 flows through resistance 59, potentiometer 61, lamp 63 and lamp 65 to ground. The circuit parameters are chosen so that this output current heats the filaments of lamps 63 and 65; and, as this occurs, the resistance of 63 and 65 increases bringing the bridge into closer balance. Thus the bridge loss increases until it is numerically equal to the amplifier gain. If the amplifier output tends to increase the resistance of lamps 63 and 65 likewise tends to become larger and the loss in the bridge becomes greater than the gain in the amplifier, causing the amplitude of the oscillations to subside until equilibrium is again reached.

Amplifiers 53 and 55 operate as class A amplifiers so as to operate in the linear range. Amplifier tubes 53 and 55 are connected as triodes in a conventional resistance-capacitance circuit.

Two outputs are taken from amplifier 55. One output is connected through capacitor 67 to the bridge 51 and the other through capacitor 69 to output-adjusting potentiometer 70 and thence to a cathode follower output tube 71. Tube 71 has output terminals 72 for the oscillating current of oscillator 18 which is fed to the analyzers 14 and 16.

The Wave Analyzers

Figure 4A:
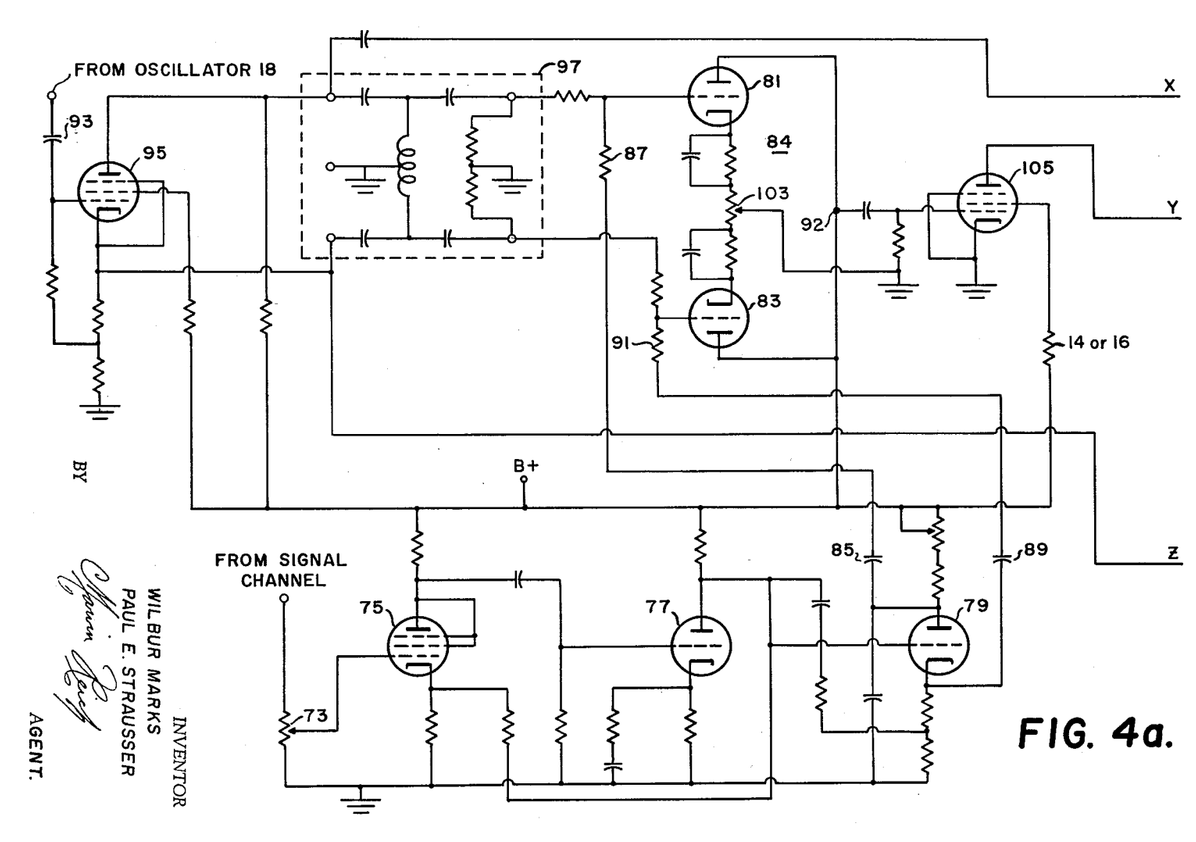
FIGS. 4a and 4b, combined on the lines X, Y and Z, are a circuit diagram of a wave analyzer which may be used in the preferred form in the invention.
Figure 4B:
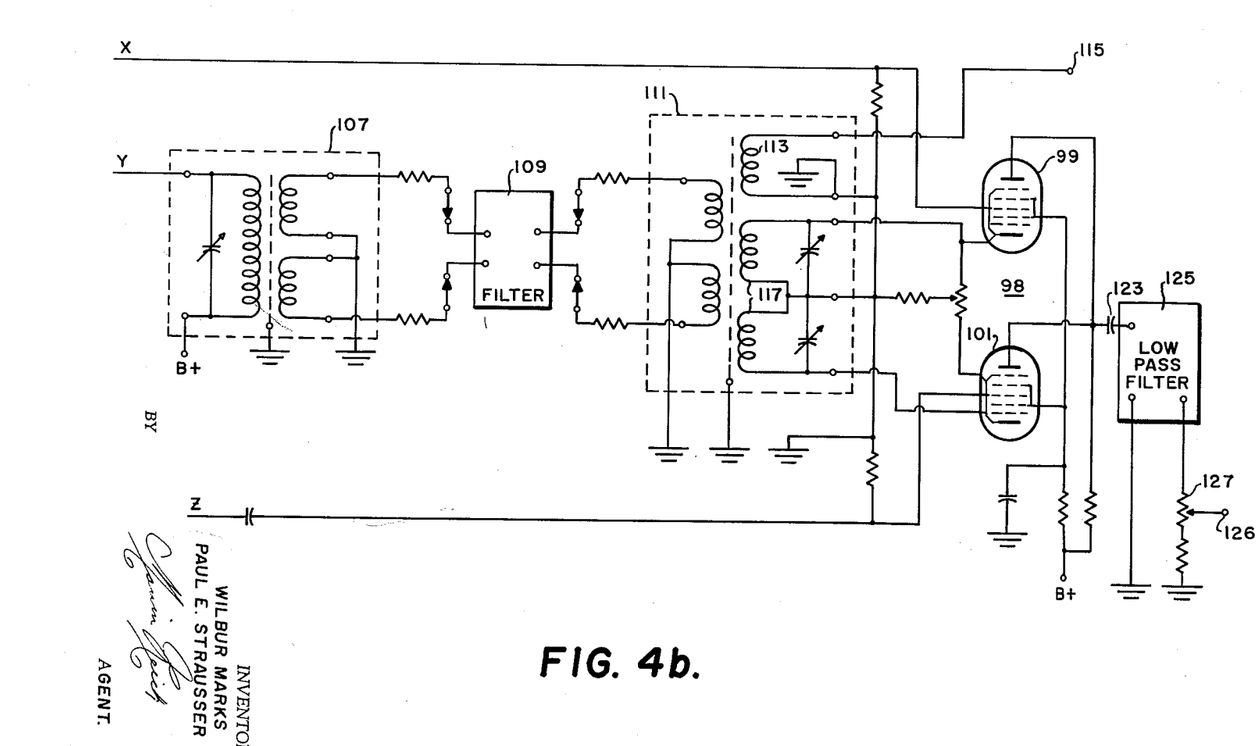

A typical wave analyzer utilizable for analyzers 14 and 16 is shown in FIGS. 4a and 4b. The analyzers are designed for class A operation so that all the frequency components of the signal passing through them are linearly treated so that the amplitude of the output representative of a particular frequency is proportional to the amplitude of the components of that frequency in the input signal.

The signal to be analyzed, coming from channels A or B as the case may be, is fed across a gain control potentiometer 73 which establishes the signal level to be applied to the control grid of amplifier 75 and thence from the plate of amplifier 75 to the control grid of amplifier 77. A phase inverter tube 79 receives its input from the plate of amplifier tube 77 and supplies two output signal voltages which are 180° out of phase. One of the signal voltages comes from the plate of the tube 79, and the other from the cathode.

Tubes 81 and 83 are connected to operate as a balanced modulator 84 of the analyzer. The signal on the plate of inverter tube 79 is coupled to the grid of modulator tube 81 by way of capacitor 85 and resistor 87. The cathode of tube 79 is coupled to the grid of modulator tube 83 by way of a capacitor 89 and resistor 91. The output signals of tubes 81 and 83 are combined at junction 92. The output of the central oscillator 18 is fed through a capacitor 93 to tube 95 of the analyzer, which functions as a buffer amplifier and phase inverter. Tube 95, functioning as a buffer amplifier, isolates the oscillator 18 from feedback disturbances that might originate in the analyzer.

The tube 95 has two outputs which are taken, respectively, from the plate and from the cathode of that tube, and fed through a high pass filter 97 to the control grids of modulator tubes 81 and 83 which are also fed from inverter tube 79, as described above. High-pass filter network 97 prevents audio signals that may come from inverter tube 79 from passing on to conductors X and Z which are connected to grids of the balanced demodulator tubes 99 and 101.

Balanced modulator tubes 81 and 83 have their cathodes interconnected by a potentiometer 103 which operates as a balance control for the output signals from the tubes. The combined output of the modulator from the plates of tubes 81 and 83 is fed through amplifier tube 105 having an output connected to conductor Y. The signal on conductor Y energizes the primary of bandpass transformer 107. The output of the transformer is fed through a filter 109. The secondary of transformer 107 and the associated resistance network acts as an impedance matching network for the filter.

The filter 109 determines the width of the frequency band being analyzed. For the particular application referred to, the mid-point of the filter bandwidth is at 97,000 cycles, and has a bandwidth in the order of 20 cycles, with the actual filter being replaceable to provide bandwidths of 2, 5, 10 or more cycles, as desired.

The output of the filter 109 is connected to the primary of transformer 111 which has a central tap connected to ground. The transformer is provided with an output secondary winding 113 connected to terminal 115 as an output for the modulated signal; this terminal 115 corresponds to output 1 of the analyzers. The signal at terminal 115 is a fixed frequency analog output. A switch may be connected to terminal 115 if desired.

Figure 5:
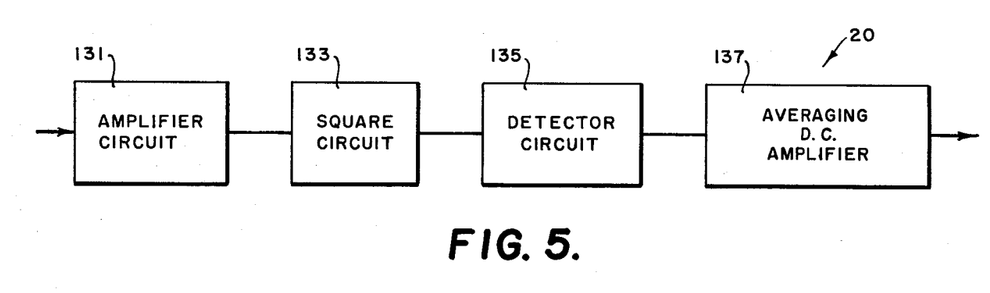
FIG. 5 is a block diagram of a suitable spectral density integrator which is used in the preferred form of the invention.

Secondary winding 117 of the transformer 111 has a center tap which is grounded and its other two terminals connected to the balanced demodulator 98 comprising tubes 99 and 101. The output of the demodulator is taken from the plate of tubes 99 and 101 through capacitor 123 and a low pass filter 125 which passes signals under 25,000 c.p.s. to an output terminal 126 of the output resistor 127. The terminal 126 corresponds to the output 2 of the analyzer. The integrators 20 and 22 are of any suitable type; that used being manufactured by Technical Products Company of Hollywood, California, and known as a "T–P 633 Power Integrator." As shown in FIG. 5, integrator 20 comprises a bandpass amplifier circuit 131 which receives the signals from analyzer outputs 1. The output of the amplifier circuit 131 is connected to the input of a squaring circuit 133 having an output that feeds the input of a detector circuit 135. The output of the detector circuit 135 is fed to a D.C. amplifier 137 which includes an averaging circuit.

Figure 6:
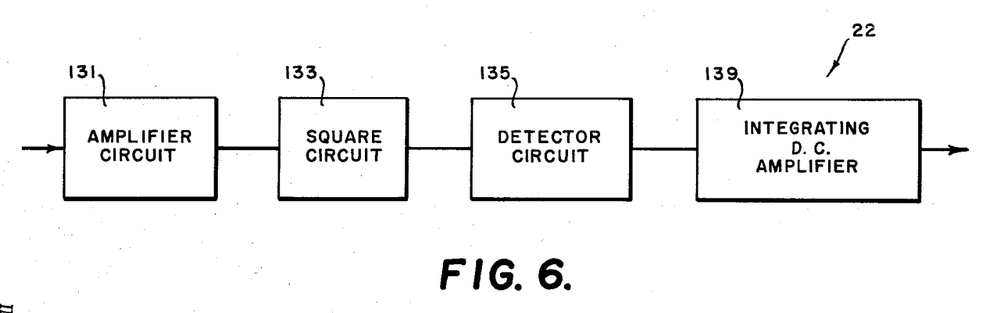
FIG. 6 is a block diagram of a suitable total energy integrator which is used in the preferred form of the invention.

As shown in FIG. 6, integrator 22 differs from that of FIG. 5 in that the averaging amplifier is replaced by an integrating D.C. amplifier 109 which includes a phase shifter integrating circuit.

Figure 7:
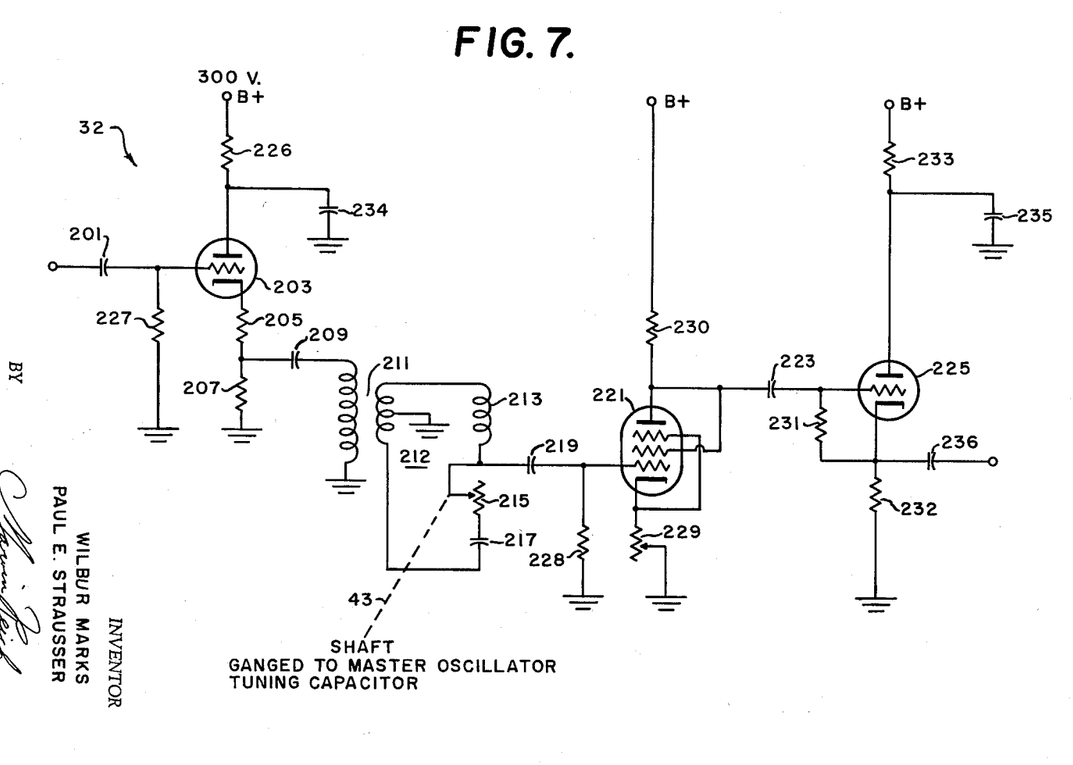
FIG. 7 is a circuit diagram of a constant voltage phase shifter which is used in the preferred form of the invention.

The detailed circuit of the phase shifter 32 is shown as FIG. 7 of the drawings. It is a constant voltage phase shifter and has an input coupling capacitor 201 which is adapted to be connected to output 2 of analyzer 14. The capacitor 201 feeds the signal to the grid of cathode follower tube 203. Cathode follower tube 203 isolates the rest of the phase shifting circuit from the analyzers. Resistors 205 and 207 are connected in series with the cathode of tube 203. The output of cathode follower tube 203 is taken from the junction of resistors 205 and 207 by a capacitor 209 which feeds it to the primary of transformer 211.

The secondary of transformer 211 has a center tap which is connected to ground. A phase shift bridge 212, comprising an inductor 213, variable resistance 215, and a capacitor 217, is connected in series between the two output leads of the secondary of transformer 211. The inductor, capacitor and resistor are chosen to give a ninety degree phase shift to the signal.

When the frequency of the oscillator 18 is varied by the motor 44, the value of the resistor must also be changed in order to keep the phase shift constant. Therefore the control shaft of variable resistance 215 is mechanically coupled to the shaft 43 of the oscillator motor 44 of the central oscillator 18.

The output of the phase shifting bridge 212 is taken from the junction of variable resistor 215 and the inductor 213 by one end of capacitor 219. The other end of capacitor 219 is connected to amplifier tube 221. The output of tube 221 is taken from its plate by capacitor 223 which feeds the signal to the grid of output cathode follower tube 225.

*Operation of System of FIG. 1*

The illustrated example of the invention in FIG. 1 operates as follows:

The data representing a physical event is sensed by any suitable sensing means or transducers and recorded on a magnetic tape recorder on the test site. An example of a physical event is the response of a Navy ship at sea to a series of waves. The information is re-recorded on a loop reel as desired at a convenient point for future use. The final recording is played back by the pick-up of the readout head 10. As many signal channels may be played back as there are on the tape. In the assumed instance, two suffice for an understanding of the invention. These signals appear as complex waves on separate channels A and B. The signal from channel A is sent to the wave analyzer 14; and the signal in channel B is sent to analyzer 16. The analyzers 14 and 16 are identical and operate simultaneously on the signals in their respective channels in identical fashion.

For purposes of explanation, the operation of a single analyzer is described since both operate identically. The description is therefore confined to the channel A branch. The signal in channel A enters the analyzer 14 across analyzer potentiometer 73 (FIGS. 4a and 4b) which establishes the level of the signal. Amplifier 75 amplifies the signal which is then fed to the second amplier tube 77. The amplied signal is split into two phases by inverter tube 79, which are fed to the balanced modulator 84. Tube 81 of the balanced modulator has the signal from the plate of tube 79 coupled to its grid, while tube 83 has its grid coupled to the cathode of tube 79. The signal from the variable frequency central control oscillator 18 is also coupled to the grids of tubes 81 and 83 by way of tube 95 which first phase splits the signal. Tube 95 also serves as an isolation element so that each analyer is isolated from the other one. The plate of tube 95 is coupled to one input side of a high pass filter 97 and the cathode of tube 95 is coupled to the other input side of filter 97.

The output ends of filter 97 transmit the oscillator signal to the grids of tubes 81 and 83 to be modulated with the signals from tube 79. High pass filter 97 also prevents the signal from inverter tube 79 from feeding back to tube 95 from the modulator tubes 81 and 83 and then forward over conductors Y and Z to the demodulator tubes 99 and 101.

In the operation of the tubes 81 and 83, the output of one is out of phase with that of the other, so that a cancellation of the odd-order modulation products results in the signal fed to tube 105. The combined output is fed through amplifier 105, and applied across the primary of transformer 107. From the transformer the signal is fed through the filter 109. Before the output signals of tubes 81 and 83 are combined the modulation products of the signals from the oscillator and the signal channel include a direct-current component proportional to the carrier, a spectrum of the information signal or modulating wave itself, a term proportional to the carrier, upper and lower sidebands around the carrier, and also around the odd harmonics of the carrier. Of these terms only the lower side band is of value in the analyzer A; and for all practical purposes most of the remaining terms are eliminated by the tubes 81, 83 and 105 and the pass-band characteristics of transformer 107. Effectively, the only remaining terms in the output circuit of transformer 107 are the upper and lower side bands of the carrier.

The operation of the filter 109 and connected elements of the analyzer may be better understood by an explanation of its operation on a particular test or information signal. Assume that this signal is complex and has a plurality of audio frequency components. For example, assume that it is desired to ascertain if a 1,000 c.p.s. signal is a component of the original complex signal wave which is being analyzed; and for the purpose of explanation, assume that there is a 1,000 c.p.s. signal component present in the wave. The signal wave is applied to the input of resistors 73, and ultimately to tubes 81 and 83.

Since the frequency to be explored is a thousand cycles, in this instance the central control oscillator 18 is tuned to operate at a thousand cycles above the 97,000 c.p.s. starting point. This will correspond to a frequency of 98,000 c.p.s. which is fed to the grid of amplified tube 95 by the oscillator. This output is modulated in balanced modulator 84 by the complex signal which includes the 1000 c.p.s. component. Two output signals of tubes 81 and 83 are the sum and difference frequencies of 1000 c.p.s. and 98,000 c.p.s., or 99,000 and 97,000 c.p.s. respectively. Consequently these signals, 99,000 and 97,000 c.p.s., are fed through the impedance matching network and transformer 107 to the filter 109.

Assume for purpose of explanation that the filter 109 in the analyzer will pass a band of frequencies 20 cycles wide with the midpoint of 97,000 c.p.s., so that the filter will pass a signal from 96,990 to 97,010 c.p.s. Therefore, of all the signals fed to the filter from the balanced modulator 84, only one, the 97,000 c.p.s. signal, will pass through the filter at this particular tuning of the central oscillator mentioned above. The 97,000 c.p.s. signal is then applied to the signal grids of balanced demodulator tubes 99 and 101 of demodulator 98. At the same time, a 98,000 c.p.s. signal on the conductors X and Z and coming from the central oscillator 18 through tube 95, is also fed to tubes 99 and 101.

When these two RF signals are heterodyned in the balanced demodulator 98, a 1000 c.p.s. output signal and a 195,000 c.p.s. output signal are both available as input voltages to low pass filter 125. This filter will reject signals of frequencies of over 25,000 c.p.s., thus only the 1000 c.p.s. signal is fed through as an output. Consequently the analyzer has a 1000 c.p.s. output signal of an amplitude proportional to that of the 1000 c.p.s. component of the input test signal on channel A.

When the tuning of the central oscillator 18 is changed, the analyzer provides another output signal proportional to the amplitude of and corresponding in frequency to the component in the input test signal that is associated with the changed tuning. In this manner, all the component-frequencies of the input test signals are derived, and thus provide a close approximation of the Fourier coefficients components of the input test signal.

To sum up the operation of the analyzer, only components present in the test signal are passed. In the example described, with the oscillator operating through a range of 97,000–122,000 c.p.s., test signals components in the range of 2–25,000 c.p.s. will be isolated from the test signal.

For the purpose of recording these components and relationships between them, the isolated components are fed to the integrators 20 and 22 from analyzer output terminals 115 corresponding to outputs 1 of FIG. 1.

Output 1, terminal 115 of the analyzers 14 and 16, provides an undemodulated analyzed output of the test signal. The signal of the outputs 1 of analyzers 14 and 16 are combined and fed to a spectral density integrator 20 which amplifies the signal in amplifier 131 and then squares the signal in squaring circuit 133. The squared signal is then detected by detector circuit 135 and amplified by a direct current amplifier 137 which has a circuit combined with the amplifier for averaging the squared signal. The continuous squared and averaged signal gives the energy spectral density which is then plotted by the X-Y plotter 24.

The input of total energy integrator 22 is fed in parallel with the spectral density integrator 20. Similarly, total energy integrator 22 amplifies, squares and detects a signal which is fed to a direct current amplifier 139 which has a circuit associated with the amplifier for integrating the squared signal. The integrated signal contains the total energy of the signal and therefore is the total energy spectrum. The output of total integrator amplifier 139 is plotted by the X-Y plotter 26 for the purpose of obtaining the cross-spectrum of the complex wave signal.

The cross spectral analyzer 29 is connected to output number 2 which is on the output side of low pass filters 125 of analyzers 14 and 16. There is a switch placed in each output line so that the signals may be switched on or off. The signal from analyzer 14 is multiplied with the signal from analyzer 16 in the analog multiplier 28, the output of which is the coordinate spectrum. The output of analyzer 14 is fed into a phase shifter 32 which shifts the phase of the signal by ninety degrees and keeps the voltage level of the signal constant. The variable resistance 215 has its control shaft ganged to the tuning condenser of the oscillator so as the different frequency components are analyzed they are all phase shifted ninety degrees. Varying the resistance of resistor 215 as the frequency of the signal changes keeps the output of the phase shifting network ninety degrees. It is noted that the phase shifting network may be placed in the output of analyzer B and the results would be the same. The phase shifted signal is then multiplied with the signal from analyzer 16 in the analog multiplier 34 having an output which is the quadrature spectrum. The signal from the analog multiplier 28 is plotted by the X-Y plotter 30 and the signal from the analog multiplier 34 is plotted by the X-Y plotter 36.

Figure 2:
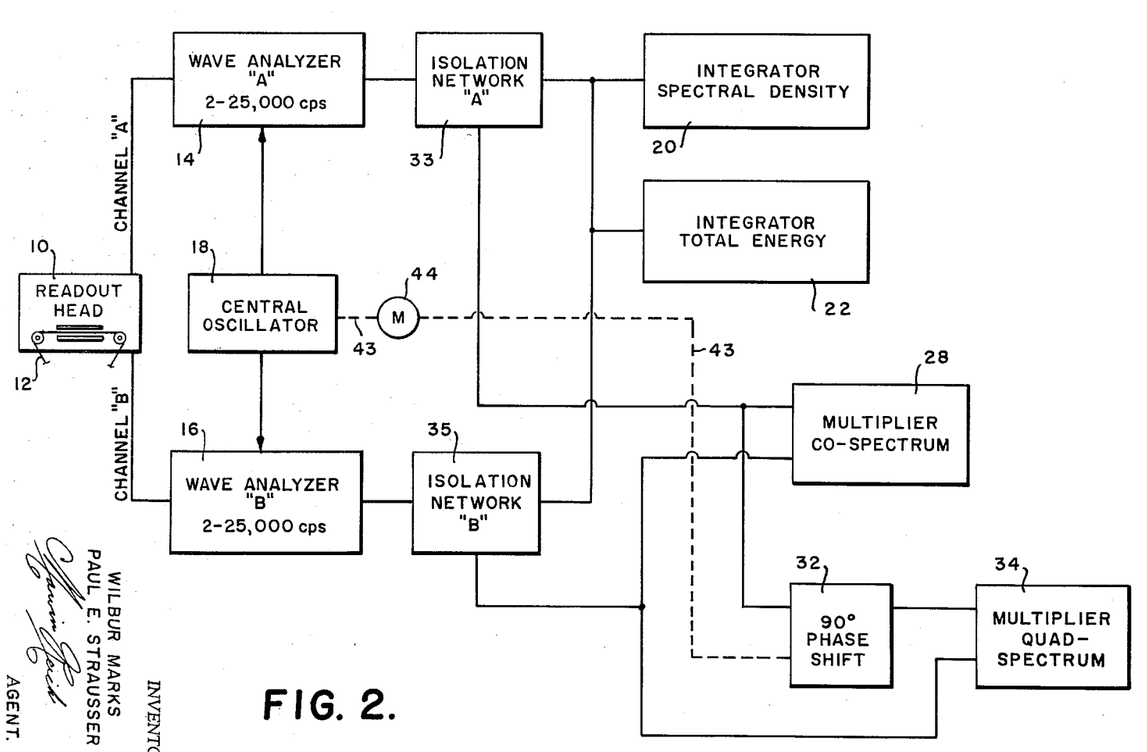
FIG. 2 is a block diagram of a modified form of spectrum analyzer embodying the invention.

FIG. 2 is similar to FIG. 1 with the difference being the inclusion of isolation networks 33 and 35. It is desirable, for certain applications, to isolate the analyzers 14 and 16 from each other, for example, by placing a cathode follower in series with output 115 of each of the analyzers.

Similarly cathode follower is placed on the output side of the low pass filter 125 in series with the output terminal of each analyzer. In this fashion cross feed between analyzers 14 and 16 is eliminated if it should become a problem when all the components are operating at one time. Accordingly, the operation of the system disclosed in FIG. 2 is similar to the operation of FIG. 1 with the addition that there cannot be any cross feed between the outputs of analyzers 14 and 16.

Obviously many modifications and variations of the present invention are possible in the light of the above teachings. It is therefore to be understood that within the scope of the appended claims the invention may be practiced otherwise than as specifically described.

What is claimed is:

1. A system for automatically analyzing a complex wave which is indicative of a series of physical events comprising; magnetic tape with information recorded thereon in the form of complex waves in a plurality of channels, a read out means in operative relationship with said magnetic tape for reading out the complex wave, a plurality of analyzers, said analyzers being connected to the readout head for analyzing the complex wave, a variable frequency central oscillator for controlling the analyzers, means connecting the central oscillator to each of the analyzers for controlling the frequency of the complex wave which is being analyzed, spectral density means for obtaining the spectral density of the wave, means connecting said spectral density means to the analyzers, total energy means for obtaining the total energy of the complex wave, means connecting the total energy means to the analyzers, cross spectrum means for analyzing the cross spectrum of the wave, said cross spectrum means being connected to the analyzers, said cross spectrum comprising: first means for multiplying the components of the complex wave signal in one analyzer with the components of the complex wave signal in another analyzer for obtaining the coordinate spectrum, said multiplier being connected to the output of the plurality of analyzers, a ninety degree voltage phase shifter, means connecting said ninety degree phase shifter to one of the analyzers, second means for multiplying the components of signals for obtaining the quadrature spectrum, said second multiplying means having two inputs one of which is connected to the ninety degree phase shifter and the other one is connected to another analyzer whereby the energy content of the complex waves may be displayed for the purpose of relating a history of the physical events.

2. An automatic analyzer system as defined in claim 1 but further characterized by said ninety degree phase shifter having an automatic stabilizing means for keeping the phase shift ninety degrees as the frequency of the signal to be shifted varies.

3. An automatic analyzer system as defined in claim 2 but further characterized by having the variable frequency oscillator variable over a range of frequency, said oscillator having a drive shaft for varying the frequency, and means coupling the automatic stabilizing means for keeping the phase shift ninety degrees to the oscillator drive shaft whereby as the frequency of the oscillator is varied to cause a different component of the frequency spectrum of the complex wave signals to be analyzed, the phase shifter is automatically compensated for the different frequency being phase shifted.

4. An automatic analyzer system as defined in claim 3 but further characterized by having a motor coupled to the drive shaft of the oscillator.

5. An automatic analyzer system as defined in claim 4 but further characterized by having a plurality of isolation networks being connected to the outputs of the analyzers so as to prevent cross over of the complex wave signals in the various channels.

6. An automatic analyzer system as defined in claim 3, but further characterized by having a plurality of isolation networks, said wave analyzer having outputs, and said isolation networks being connected to the outputs of the analyzers so as to prevent cross over of the complex wave signals in the various channels.

7. An automatic analyzer system as defined in claim 2 but further characterized by having a plurality of isolation networks, said wave analyzer having outputs and said isolation networks being connected to the outputs of the analyzers so as to prevent cross over of the complex wave signals in the various channels.

8. An automatic analyzer system as defined in claim 1 but further characterized by having a plurality of isolation networks, said wave analyzer having outputs, and said isolation networks being connected to the outputs of the analyzers so as to prevent cross over of the complex wave signals in the various channels.

9. A system for automatically analyzing a complex wave which is indicative of a series of physical events comprising; storage means containing information in a plurality of channels, readout means for obtaining the information from the storage means, said readout means being in operating relationship with said storage means, a plurality of wave analyzer means, a central control means generating a variable control signal, said central control means being connected to said wave analyzers for feeding the same variable control signal to all of said analyzers to control the frequency being analyzed, cross spectrum means for obtaining the cross spectrum of the energy of the complex waves, said cross spectrum means being connected to said analyzers, said analyzers being connected to said readout means whereby the information in the plurality of channels are analyzed simultaneously.

10. An automatic analyzer system as defined in claim 9 but further characterized by having a plurality of isolation networks, said isolation networks being connected to the outputs of the analyzers so as to prevent cross over of complex wave signals between the various analyzers.

11. A system for automatically analyzing a plurality of complex waves which is indicative of a series of physical events comprising, a source of energy representing said physical events containing a plurality of information channels, means for analyzing said information, said means being connected to the source of information, cross spectrum means for obtaining the cross spectrum of said energy of the complex waves, total energy means for obtaining the total energy content of said complex waves, spectral density means for obtaining the spectral density of the complex waves, said cross spectrum means, total energy means and said spectral density means being connected to the analyzing means whereby the energy content of the complex signal waves may be displayed for the purpose of relating a history of the physical events.

12. An automatic analyzer system as defined in claim 11 but further characterized by having a plurality of isolation networks, said isolation networks being connected between the analyzers and said cross spectrum means so as to isolate the analyzers from each other.

13. An automatic analyzer system as defined in claim 12, but further characterized by having a plurality of X-Y plotters, a plotter connected to the total energy means and the spectral density means.

14. An automatic analyzer system as defined in claim 8, but further characterized by having a plurality of X-Y plotters, a plotter connected to the total energy means and the spectral density means.

15. An automatic analyzer system as defined in claim 4, but further characterized by having a plurality of X-Y plotters, a plotter connected to the total energy means and the spectral density means.

16. A system for automatically analyzing a plurality of complex waves containing energy which is indicative of a series of physical events comprising, a plurality of wave analyzer means, each of said wave analyzer means containing an output and an input adapted to receive a complex wave, cross spectrum means for obtaining the cross spectrum of said energy of said complex waves, total energy means for obtaining the total energy content of said complex waves, said cross spectrum means and said total energy means being connected to the analyzer means whereby the energy content of the complex signal waves may be displayed for the purpose of relating a history of the physical events.

17. An automatic analyzer system as defined in claim 16 but further characterized by a plurality of isolation networks connected between the analyzers and said cross spectrum means so as to isolate the analyzers from each other.

18. A system for automatically analyzing a plurality of complex waves which is indicative of a series of physical events comprising, a source of energy representing said physical event containing a plurality of information channels, means for analyzing said information, said means being connected to the source of information, cross spectrum means for obtaining the cross spectrum of said energy of the complex waves, spectral density means for obtaining the spectral density of the complex waves, said cross spectrum means and said spectral density means being connected to the analyzing means whereby the energy content of the complex signal waves may be displayed for the purpose of relating a history of the physical events.

19. An automatic analyzer system as defined in claim 18 but further characterized by having a plurality of isolation networks, said isolation network being connected between the analyzers and said cross spectrum means so as to isolate the analyzers from each other.

References Cited in the file of this patent

UNITED STATES PATENTS

| | | |
|---|---|---|
| Re. 24,670 | Smith | July 21, 1959 |
| 2,378,383 | Arndt | June 19, 1945 |
| 2,851,661 | Buland | Sept. 9, 1958 |
| 2,983,870 | Wallace | May 9, 1961 |
| 2,998,568 | Schlessel | Aug. 29, 1961 |